July 26, 1960 — C. W. EDGERTON, JR — 2,946,556
PUSH-PULL ACTUATOR
Filed Feb. 12, 1959 — 2 Sheets-Sheet 1

INVENTOR:
Charles Willis Edgerton, Jr.
BY Howson & Howson
ATTYS

July 26, 1960
C. W. EDGERTON, JR
2,946,556
PUSH-PULL ACTUATOR
Filed Feb. 12, 1959
2 Sheets-Sheet 2
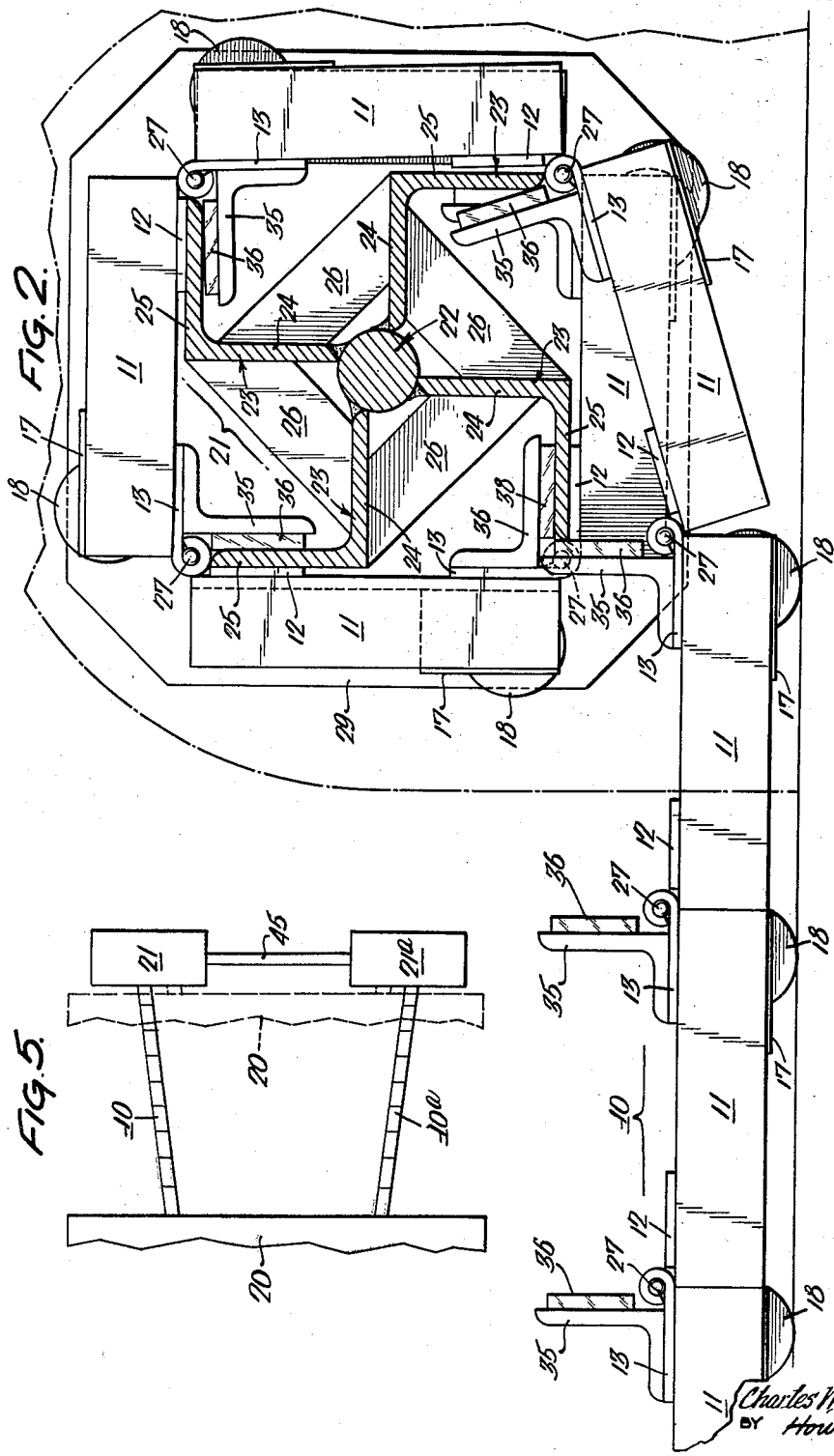
INVENTOR:
Charles Willis Edgerton, Jr.,
BY Howson &
Howson
ATTYS.

United States Patent Office 2,946,556
Patented July 26, 1960

2,946,556

PUSH-PULL ACTUATOR

Charles Willis Edgerton, Jr., Bryn Mawr, Pa., assignor to Wayne Iron Works, Wayne, Pa., a corporation of Pennsylvania Filed Feb. 12, 1959, Ser. No. 792,913

7 Claims. (Cl. 254—1)

The present invention relates to a push-pull actuator for extending and retracting a structural member, and has particular application to rolling grandstands which are operated between an open position on a gym floor and a closed position nested against the wall of the gym.

A primary object of the present invention is to provide a push-pull actuator occupying a limited space in its retracted position as well as in its extended position.

More specifically, the present invention contemplates an actuator comprising a plurality of interconnected links operable to be wound upon a rotor in closely spaced helical convolutions in the retracted position of the actuator and to form a rigid pusher arm in the extended position of the actuator.

The invention also provides an actuator which is economical to manufacture and is fully effective in operation and use.

All of the objects of the invention and the various features and details of the construction and operation thereof are more fully set forth hereinafter with reference to the accompanying drawing in which:

Fig. 2 is a sectional view taken on the line 2—2 of Fig. 1;

Fig. 5 is a diagrammatic plan view of an actuator according to the present invention applied to a grandstand unit.

Figure 3:
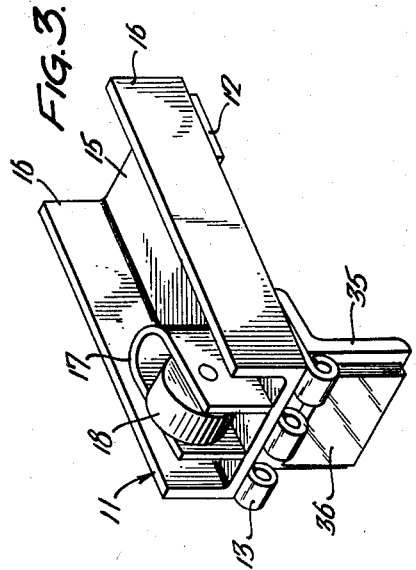
Figs. 3 and 4 are inverted perspective views showing the details of the construction of the individual links of the actuator.
Figure 4:
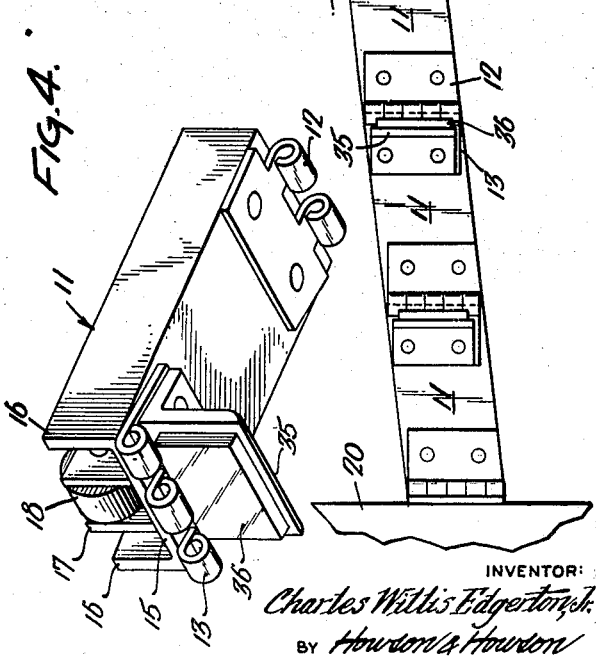

Referring now to the drawings, the actuator of the present invention comprises a plurality of interconnected links operable to be extended to form a rigid arm for pushing and pulling the structural unit, but which are capable of being wound about a rotor in closely spaced convolutions. In the illustrated embodiment of the invention, the push-pull arm 10 of the actuator comprises a plurality of similar links 11 having mounted at the opposite ends thereof complementary hinge elements 12 and 13 respectively for pivotal connection of the same, for example by pins 27. As shown in Figs. 3 and 4, the links 11 are formed of inverted U-shaped channels having a horizontal web portion 15 and depending side flanges 16. Intermediate the side flanges 16, a wheel bracket 17 is positioned which journals for free rotation a wheel 18 projecting below the flanges 16 to support the links 11 in their travel on the floor or other supporting surface and to limit relative pivotal movement of the links in one direction when they are extended. As shown in Fig. 2, the engagement of the flanges 16 of adjacent links 11 limits the relative pivotal movement of the hinge elements 12 and 13 in the other direction when they are extended in the aligned position shown. The forwardmost link is hinged to the structural member 20, in the present instance the forward seat section of a movable grandstand, and the weight of the structural unit prevents upward displacement of the outermost links. The rolling engagement of the wheels 18 on the floor prevents the arm 10 formed by the links 11 from buckling in a downward direction. Thus, when the arm is extended, the links form a rigid inflexible push-pull arm.

In accordance with the invention, the arm 10 formed by the links 11 is operable to be wound in closely spaced convolutions on a rotor 21 having a rotary axis parallel to the hinge pins 27. In the present instance, the rotor 21 comprises a shaft 22 journalled in bearings 30 and having a plurality of, in the present instance, four, supporting arms 23 formed of angle irons, each having a leg substantially radial to the shaft 22 and a foot disposed at right angles to said leg and extending the full axial length of the rotor between the opposite end plates 29. The feet 25 of the arms 23 form the outer link-engaging surface of the rotor and substantial structural rigidity is supplied to the rotor by means of reinforcing webs 26 spanning between the legs 24 of the arms 23 at spaced locations along the length of the rotor. As shown in Fig. 2, the feet 25 define a prism, in the present instance a square prism, in which the circumferential width of the faces corresponds to the length of the links 11. Thus, the hinge pins 27 interconnecting the hinge elements 12 and 13 overlie the corners of the prism defined by the foot members.

In the present instance, the rotor is rotated by a worm wheel 31 keyed to the shaft 22 and driven by a worm 32 mounted, as indicated schematically by the broken lines 33 on the rotor of a motor 34. To drive the arm 10 from the rotor 21, toe portions 35 project upwardly from each link 11 to engage a foot 25 of the rotor. A friction toe plate 36 is mounted on the toe portion 35 to afford sliding displacement of the tips of the foot portions 25 on the toe portion 35 as the rotor extends the arm 10. As shown in Fig. 2, as the rotor is driven clockwise, the leading edge or tip of the foot portion 25 bears against the upstanding toe portion 35 of the links adjacent the floor or other supporting surface. As the rotor rotates clockwise from its illustrated position, the link 11 is displaced toward the left by the engagement of the leading edge against the friction toe plate 36, the leading edge traveling upwardly on the toe plate and disengaging the same as the succeeding link approaches the floor. As the rotor is driven counterclockwise, the outer face of the foot portion 25 bears against the upper surface of the link 11 adjacent its leading end and causes the link to drag or pull the remaining links to the right for winding upon the rotor.

The composition of the friction toe plate 36 is selected to provide limited frictional engagement of the plate with the tip of the foot portion 25. In this way, the tip partially supports the trailing end of the link as it approaches the floor, thereby limiting the impact of the roller 18 on the floor. The frictional engagement is insufficient to raise the link roller 18 from the floor after the tip of the foot passes its lowermost point in its rotation about the shaft 22 so that the roller 18 is free to roll along the floor as the arm 10 is unwound from the rotor. It is noted that the pivotal movement of the links as they are unwound afford limited rearward displacement of the links relative to the rotor which insures firm engagement of the tip of the foot with the friction toe plate, as shown in Fig. 2. This construction affords a gradual, as opposed to an abrupt, transfer of the load from one pusher foot to the next as the arm 10 is extended.

Figure 1:
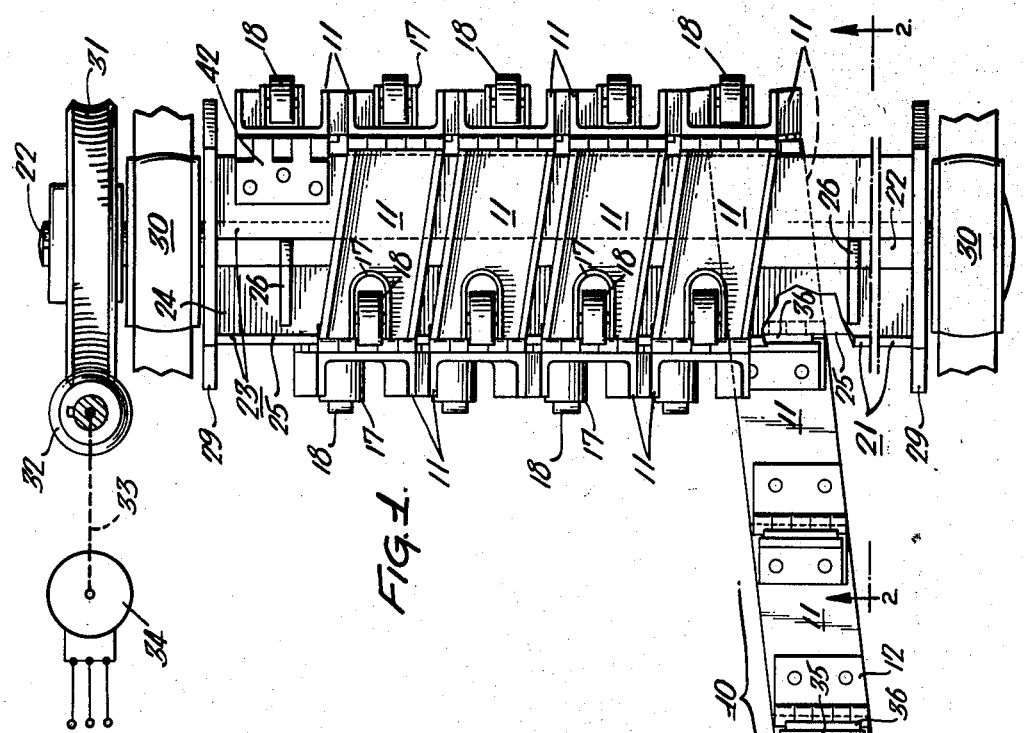
Fig. 1 is a plan view of an actuator made in accordance with the present invention in partially extended position.

The angle form of the arms 23 provides a recess in each prism face of the rotor which receives the projecting toe portions 35 of the link when the arm is wound upon the rotor. To permit helical winding of the arm 10 on the rotor, the plan of the links is a parallelogram with the leading and trailing edges of the links at an angle to the longitudinal center line thereof corresponding to the winding pitch of the arm on the rotor. The rollers are journalled on axes parallel to the hinge pin 27 so that each link is extended in a path perpendicular to the rotary axis of the rotor 21. Inasmuch as the feet 25 of the rotor 21 define a quadrilateral prism having recesses therein, the trailing edge of each link is offset laterally a distance approximately one quarter of the width of each link in a direction perpendicular to the path of movement of the link. Thus, the trailing edge of the fourth link is offset from the leading edge of the first link a distance slightly greater than the width of the links and, therefore, is free to overlie the corner of the prism alongside the latter. Thus, the arm 10 may be wound upon the rotor with every fourth hinge pin in alignment and overlying a corner of the quadrilateral prism. As shown in Fig. 1, the final link is hinged to the rotor for example by a hinge element 42 similar to the hinge element 12, mounted on the foot 25 as shown adjacent one end plate 29.

When the actuator of the present invention is applied to a long structural element, for example, a grandstand, it is preferred to arrange the arms in complementary pairs, as indicated at 10 and 10a in Fig. 5. Separate rotors may be provided as indicated schematically at 21 and 21a, and the rotors are connected to operate in synchronism, for example by a common shaft 45. Where the rotors 21 and 21a are spaced apart a substantial distance, separate drive means are provided for each rotor to eliminate excessive stress on the connecting shaft or other synchronizing device, but where the rotors 21 and 21a are closely spaced, a single drive means may be utilized to drive the two rotors.

While a particular embodiment of the present invention has been herein illustrated and described, it is not intended to limit the invention to such disclosure, but changes and modifications may be made therein and thereto within the scope of the following claims.

I claim:

1. A push-pull actuator for operating grandstands and like structures between an open and a nested position on a floor, comprising a rotor having an axis of rotation parallel to the floor, an actuating arm operable to be wound in a helix on said rotor, said arm comprising a plurality of rigid links, and hinge means interconnecting adjacent links for pivotal movement between an open limit position in which said links are in longitudinal alignment parallel to the floor, and a closed position in which said links are at an angle to one another on said rotor, the axis of said hinge means being disposed parallel to said rotor axis and at an angle to the longitudinal center line of said links corresponding to the winding pitch of said helix on said rotor whereby said links lie side-by-side on said rotor without overlapping when wound thereon, said links having means limiting pivotal movement of said links when in said open position parallel to the floor to provide a rigid push arm for extending said structure to open position.

2. An actuator according to claim 1 wherein each link comprises a U-shaped channel member having a web parallel to the floor and side flanges depending toward the floor, hinge means of said links connecting said webs with the side flanges of adjacent links in abutting relation when the arm is extended.

3. An actuator according to claim 2 including a wheel journalled between said side flanges for rotation about an axis parallel to the axis of said hinge means and supporting the associated link for rolling movement on said floor.

4. An actuator according to claim 2 including a toe plate extending upwardly from said web and operable to engage said rotor whereby said rotor advances said links outwardly therefrom as the arm is unwound therefrom.

5. A push-pull actuator for grandstands and like structures comprising a rotor, and an actuating arm operable to be advanced from a position wound helically on said rotor to a position projecting outwardly from said rotor, the actuating arm comprising a plurality of similar rigid links hingedly connected at their ends, said rotor being in the form of an equilateral prism, each of the faces of said prism having a width corresponding to the length of said links whereby the ends of said links overlie the corners of said prism, said actuating arm projecting from said rotor at an angle affording helical winding of said links on said rotor, each link having a pusher toe extending from the trailing end thereof with respect to its advancing movement, said toe extending inwardly of said rotor when the arm is wound thereon, the rotor being formed with a recess in each face for receiving said pusher toe.

6. An actuator according to claim 5 wherein said rotor comprises a shaft, and a plurality of supporting arms each having a leg substantially radial to said shaft and terminating in a foot disposed at right angles thereto, the foot defining a portion of one face of the prism and terminating at its leading edge in a tip portion operable to engage the toe of the link to advance the same, the tip of said foot portion being in spaced alignment with the next adjacent foot and defining the trailing edge of the next adjacent face of the prism, the space between said feet receiving the toe of the link engaged on said rotor.

7. An actuator for grandstands and like structures comprising a pair of axially-spaced aligned rotors, means to drive said rotors in synchronism, an actuating arm wound helically on each rotor and operable to be extended outwardly therefrom at an angle corresponding to the winding pitch of the arm on the rotor, said arms being wound with right and left hand pitch respectively whereby said arms diverge when extended, and means adapted to mount the outer ends of said arms on the grandstand, said arms comprising a plurality of rigid links hingedly connected to wind upon said rotors and operable when extended to form rigid inflexible arms.

References Cited in the file of this patent

UNITED STATES PATENTS

| | | |
|---|---|---|
| 991,401 | White | May 2, 1911 |
| 2,481,471 | Crot | Sept. 6, 1949 |